(12) United States Patent
Muscarella et al.

(10) Patent No.: US 6,263,553 B1
(45) Date of Patent: Jul. 24, 2001

(54) MACHINE TOOL WITH SERVO DRIVE MECHANISM

(75) Inventors: Patrick L. Muscarella, Penfield; Steven K. Patridge, Webster, both of NY (US)

(73) Assignee: Davenport Industries, LLC., Rochester, NY (US)

( * ) Notice: Subject to any disclaimer, the term of this patent is extended or adjusted under 35 U.S.C. 154(b) by 0 days.

(21) Appl. No.: 09/769,189

(22) Filed: Jan. 25, 2001

Related U.S. Application Data

(63) Continuation of application No. 09/604,484, filed on Jun. 27, 2000.

(51) Int. Cl.[7] .............................. B23P 23/00; B23Q 5/04; B23Q 7/02; B23B 7/04
(52) U.S. Cl. .............................. 29/38 B; 29/38 C; 82/129
(58) Field of Search .................................. 29/38 A, 38 B, 29/38 R, 563, 33 K, 53, 27 C; 82/129, 118, 121

(56) References Cited

U.S. PATENT DOCUMENTS

| | | | |
|---|---|---|---|
| 1,622,678 | * | 3/1927 | Schramm .............................. 29/38 B |
| 2,555,617 | * | 6/1951 | Swartz et al. ........................ 29/38 B |
| 3,693,485 | * | 9/1972 | Maurer .................................. 82/121 |
| 3,740,161 | * | 6/1973 | Milewski .............................. 29/38 B |
| 4,523,359 | * | 6/1985 | Gippa .................................... 29/38 A |
| 4,612,690 | * | 9/1986 | Baker .................................... 29/563 |
| 4,779,318 | * | 10/1988 | Henderson ............................ 29/38 B |
| 5,459,915 | * | 10/1995 | Mendenhall ....................... 82/129 Y |
| 5,826,318 | * | 10/1998 | Sullalti ................................. 29/38 B |
| 5,910,201 | * | 6/1999 | Muscarella et al. .................. 82/129 |
| 5,953,970 | * | 9/1999 | Haller et al. .......................... 82/129 |

FOREIGN PATENT DOCUMENTS

| | | | |
|---|---|---|---|
| 4111545 | * | 10/1992 | (DE) ..................................... 29/38 A |
| 0046883 | * | 3/1982 | (EP) ..................................... 29/38 A |
| 2044155 | * | 10/1980 | (GB) ..................................... 29/38 A |
| 1414571 | * | 8/1988 | (SU) ..................................... 29/38 R |

* cited by examiner

*Primary Examiner*—William Briggs
(74) *Attorney, Agent, or Firm*—Michael A. O'Neil

(57) ABSTRACT

A machine tool has a cam shaft and indexing drive mechanism which is driven by a servomotor and is therefore adapted for operation within a wide range of operational parameters. An encoder mechanism provides feedback to the servo drive mechanism to effect operational control. The machine tool further comprises a variable frequency drive motor which operates the spindles of the machine tool independently of the cam shaft and indexing drive. A servo-operated threading mechanism is operable at one or more workstations of the machine tool to provide threading of parts manufactured thereby. A computer control system controls and monitors the entire operation of the machine tool.

3 Claims, 18 Drawing Sheets

MACHINE TOOL WITH SERVO DRIVE MECHANISM

This application is a continuation of application Ser. No. 09/604,484, filed Jun. 27, 2000.

TECHNICAL FIELD

This invention relates generally to machine tools, and more particularly to a machine tool having a servo drive mechanism for the cam shafts and the indexing mechanism of the machine tool and a variable frequency drive motor for the spindles of the machine tool.

BACKGROUND AND SUMMARY OF THE INVENTION

The Davenport Model B screw machine is one of the world's most popular machine tools. Although completed in 1927, the design of the Model B has withstood the test of time and continues to compete favorably with computer controlled machine tools introduced much more recently. Perhaps this is because the Model B is economical to purchase and use and highly reliable in operation.

The present invention comprises an improvement over the Davenport Model B. While preserving many features of the Model B, the machine tool of the present invention differs therefrom by providing a servo mechanism for operating the cam shafts and the indexing mechanism of the machine tool. The machine tool of the present invention further differentiates over the prior art by providing a variable frequency drive motor for operating the spindles of the machine tool. The machine tool of the present invention further differentiates over the prior art by providing a servo mechanism for performing threading operations. The machine tool of the present invention further differs from the prior art in that it is provided with a computer controlled system which controls and monitors the entire operation of the machine tool.

In accordance with the broader aspects of the invention, a machine tool is provided with a cam shaft and an indexing drive mechanism which is independent from the spindle drive mechanism. The cam shaft and indexing drive mechanism is driven by a servomotor and is therefore adapted for operation within a wide range of operational parameters. An encoder provides feedback to the servo drive mechanism to effect operational control.

The machine tool of the present invention further comprises a variable frequency drive motor which operates the spindles of the machine tool. In this manner the rotational speed of the spindles is precisely controlled.

The machine tool of the present invention further comprises a servo-operated threading mechanism. The threading mechanism is operable at one or more workstations of the machine tool to provide threading of parts manufactured thereby.

The machine tool of the present invention further comprises a computer control system which controls and monitors the entire operation of the machine tool. In particular, the computer control system regulates the operation of the cam shaft and indexing servo mechanism, controls the operation of the threading servo mechanism, and controls the operation of the variable frequency spindle drive motor.

BRIEF DESCRIPTION OF THE DRAWINGS

A more complete understanding of the invention may be had by reference to the following Detailed Description, when taken in conjunction with the accompanying Drawings, wherein.

DETAILED DESCRIPTION

Figure 1:
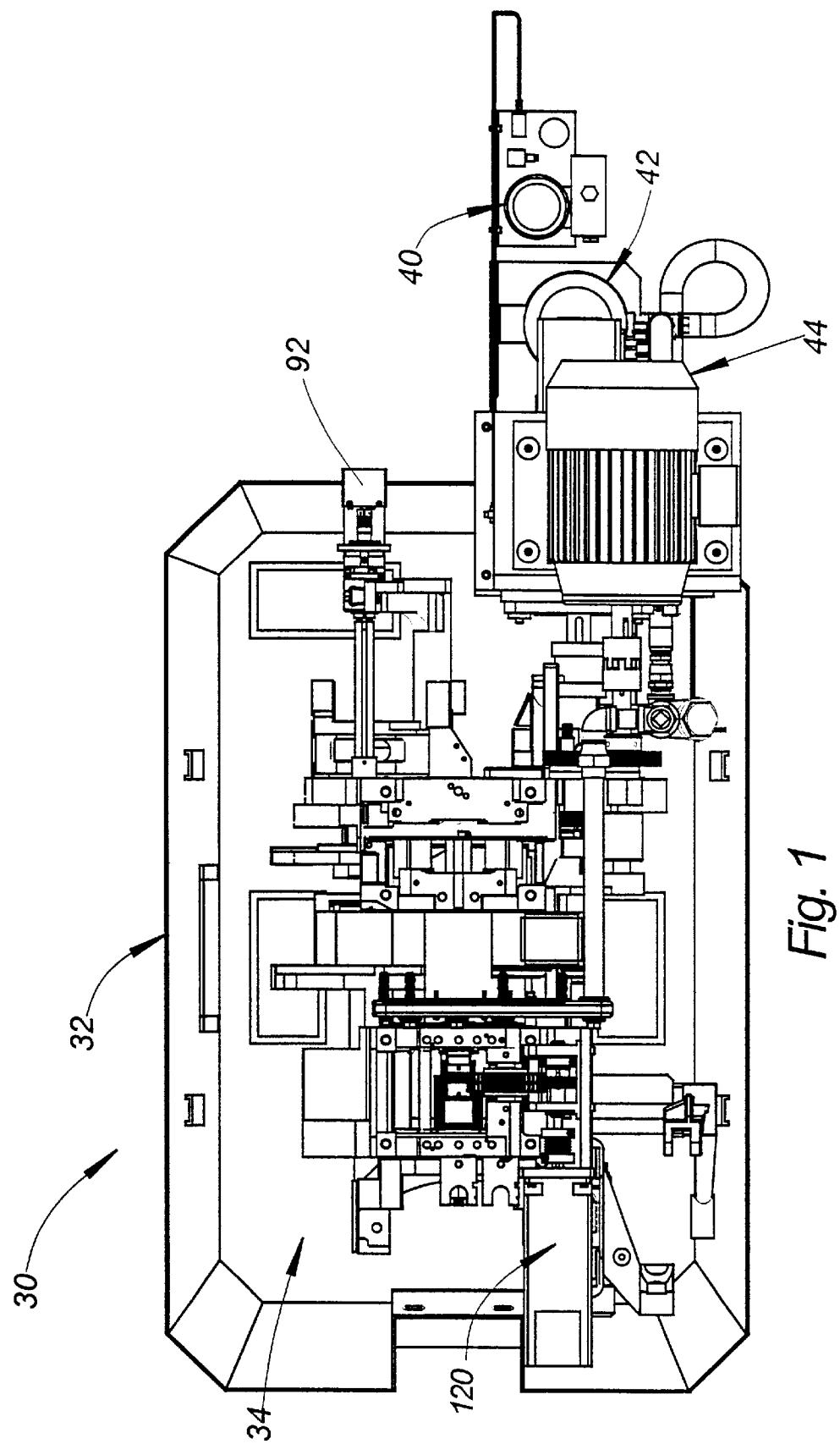
FIG. 1 is a top view of a machine tool incorporating the present invention.
Figure 2:
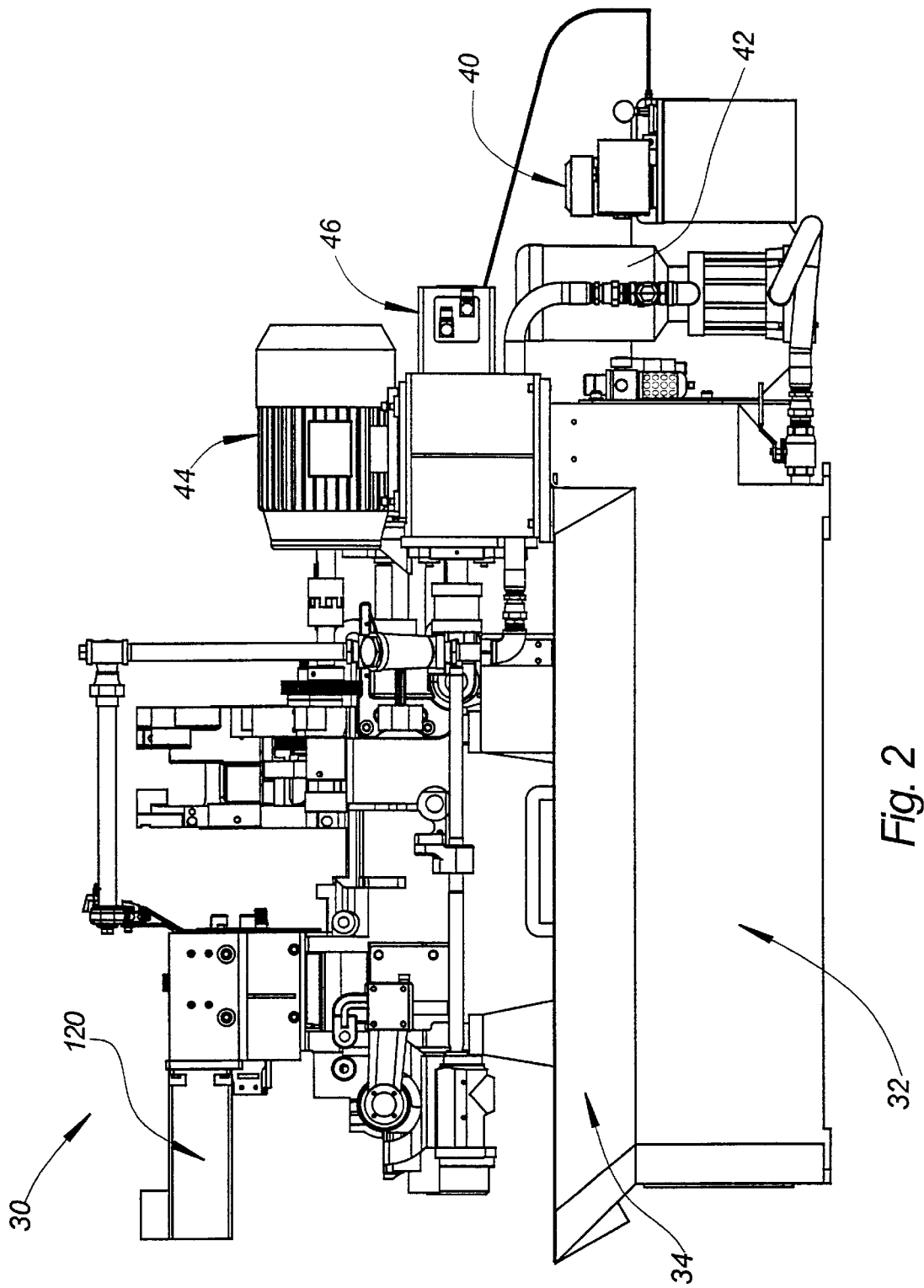
FIG. 2 is a side view of the machine tool of FIG. 1.
Figure 3:
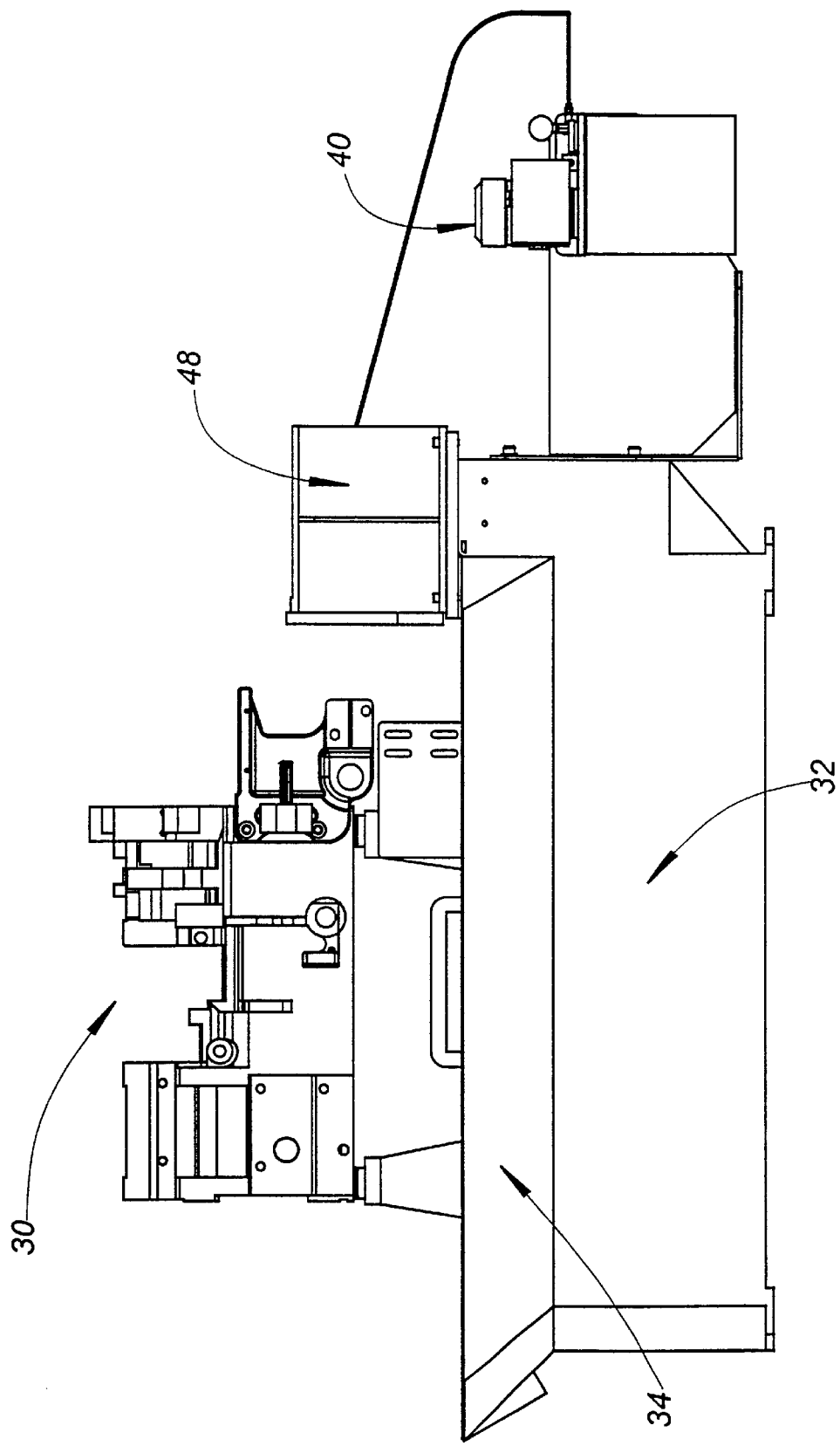
FIG. 3 is a side view similar to FIG. 2 further illustrating certain components of the machine tool.
Figure 4:
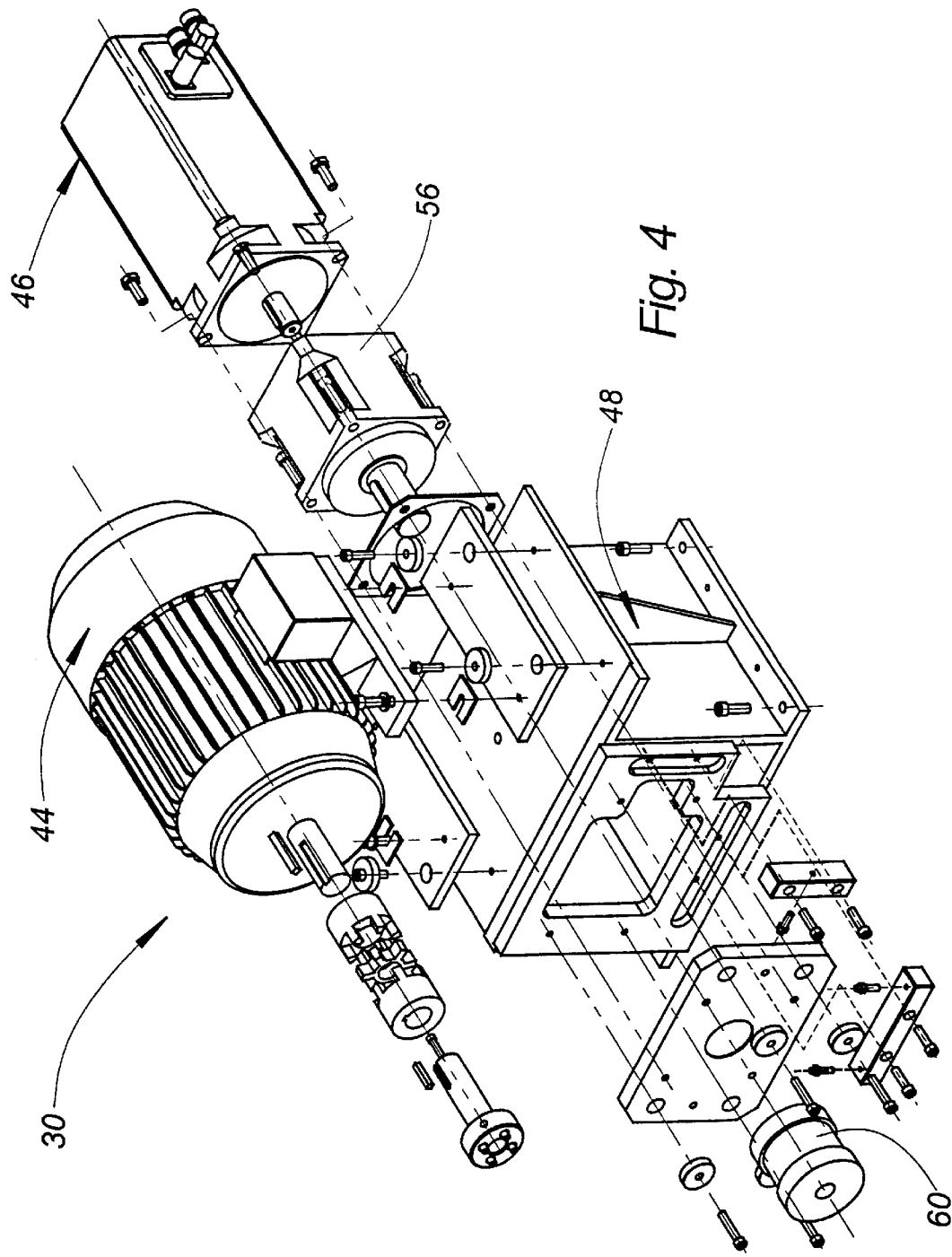
FIG. 4 is an exploded perspective view illustrating the spindle drive mechanism, the cam shaft and indexing servo drive mechanism, and a bracket assembly which supports the spindle drive mechanism and the cam shaft and indexing servo mechanism.

Referring now to the Drawings, and particularly to FIGS. 1 and 2 thereof, there is shown a machine tool 30 incorporating the present invention. The machine tool 30 is of the type commonly known as a screw machine and includes a base or frame 32 comprising a pan 34 which serves as a coolant reservoir for the machine tool 30.

A lubricating fluid pump assembly 40 is situated at one end of the machine tool 30. The lubricating fluid pump assembly 40 functions to direct lubricating fluid to all of the operating components of the machine tool 30. A coolant pump assembly 42 is located adjacent the lubricating fluid pump assembly 40. The coolant pump assembly 42 functions to withdraw coolant from the pan 34 and to circulate coolant to all of the machining tools operated by the machine tool 30.

The machine tool 30 includes a variable frequency spindle drive motor 44 and a servo drive motor 46 which operates the cam shafts and the indexing mechanism of the machine tool 30. As is best shown in FIG. 34, the spindle drive motor 44 and the servomoter 46 are supported on a bracket 48 which is in turn supported by the base or frame 32 of the machine tool 30.

Figure 5:
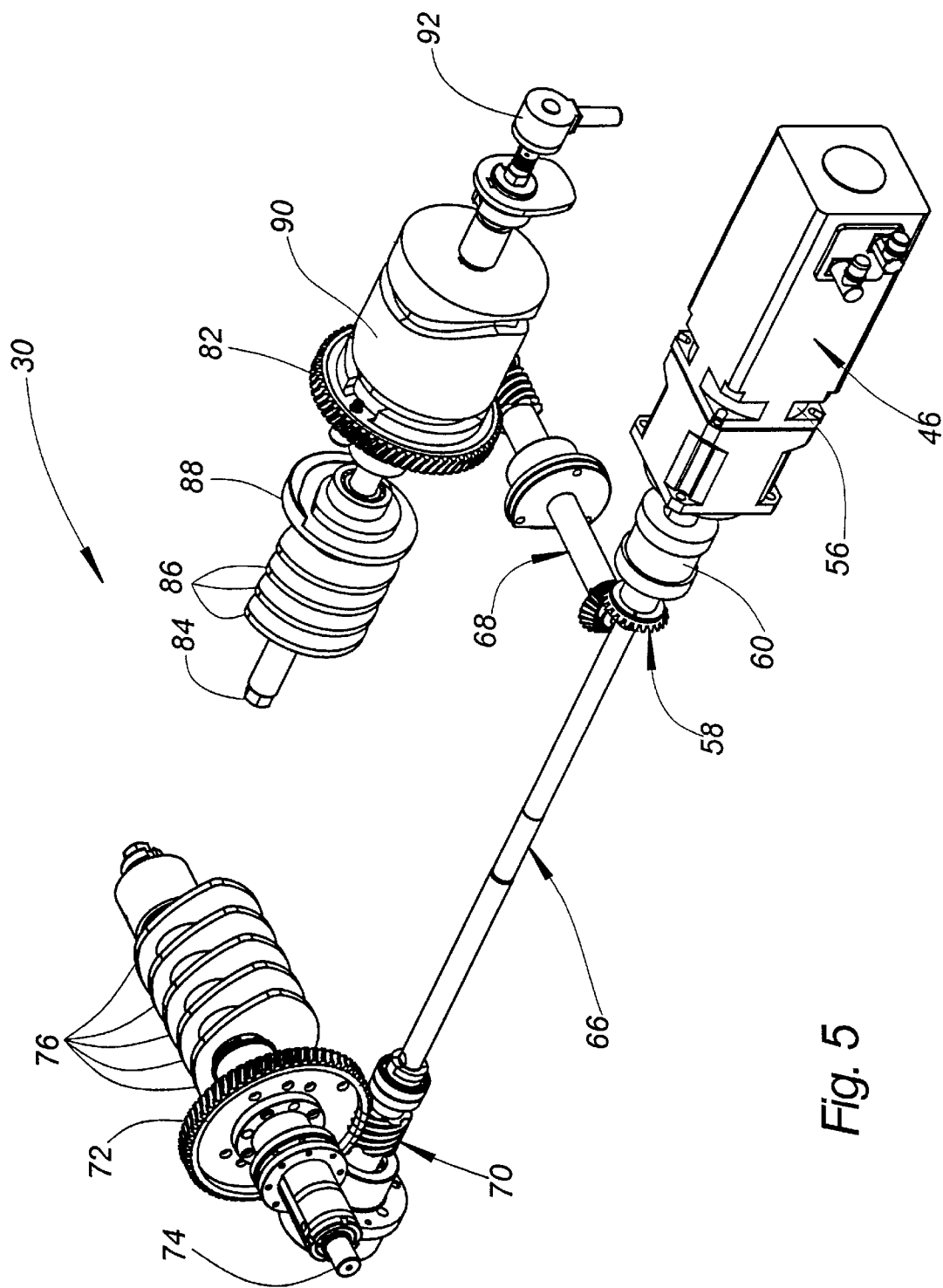
FIG. 5 is a perspective view illustrating the cam shaft and indexing servo drive mechanism of the present invention.
Figure 6:
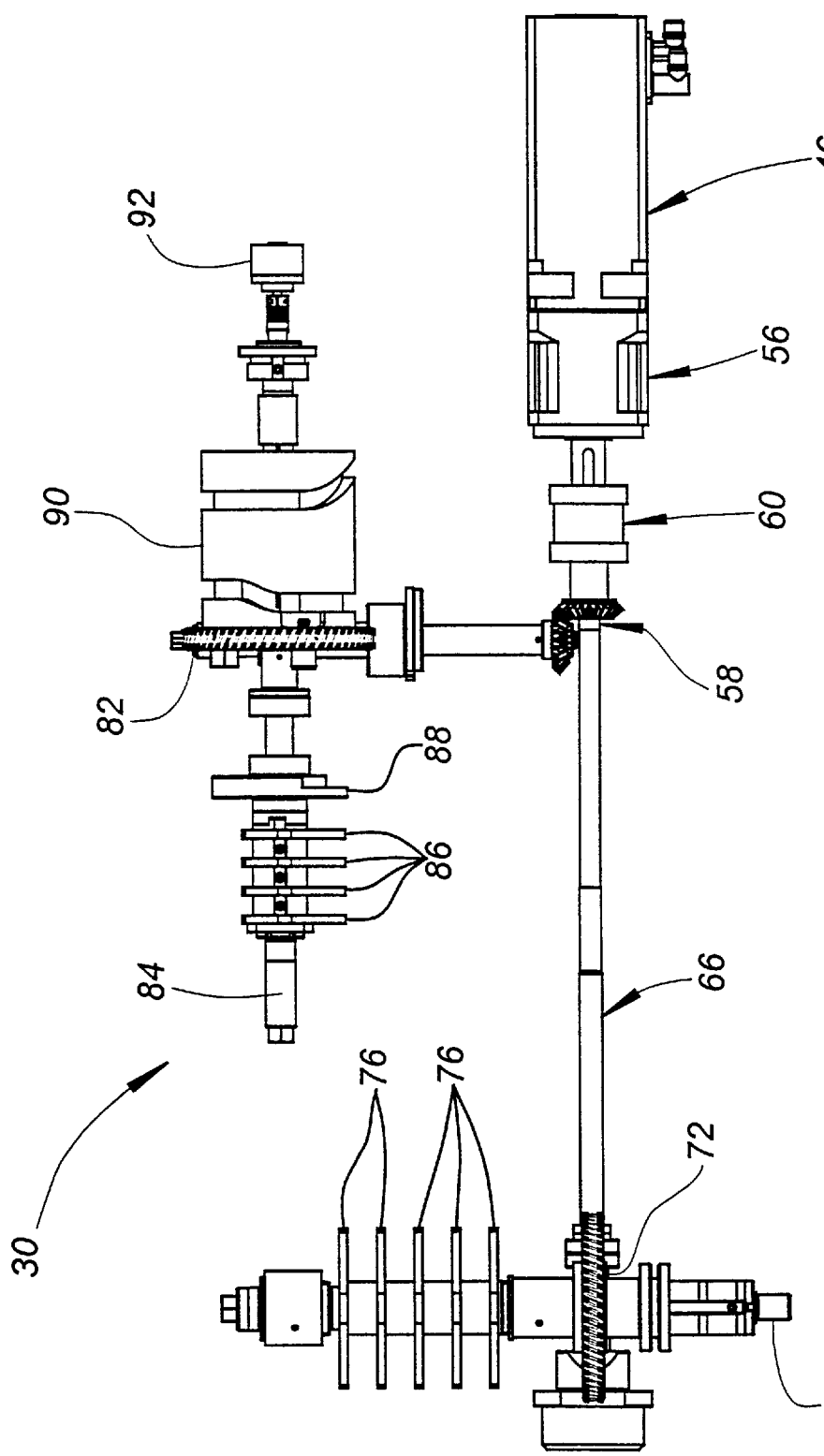
FIG. 6 is a top view of the cam shaft and indexing servo drive mechanism of the present invention.

Referring to FIGS. 5 and 6, the servomotor 46 is operatively connected to a gear box 56 which in turn drives a bevel gearset 58 through a coupling 60.

The bevel gearset 58 directs operating power from the servomotor 46 to a drive shaft 66 and to a drive shaft 68 extending perpendicularly to the drive shaft 66. The drive shaft 66 extends to a rear worm 70 which drives a gear 72. The gear 72 causes rotation of an end cam shaft 74 which in turn rotates a plurality of tool spindle cams 76.

The drive shaft 68 drives a front worm 80 which drives a gear 82. The gear 82 in turn drives a side cam shaft 84 to cause rotation of a plurality of cross slide cams 86 and a locating cam 88. The gear 82 also causes rotation of a chuck and feed cam 90 and an absolute encoder 92.

Figure 7:
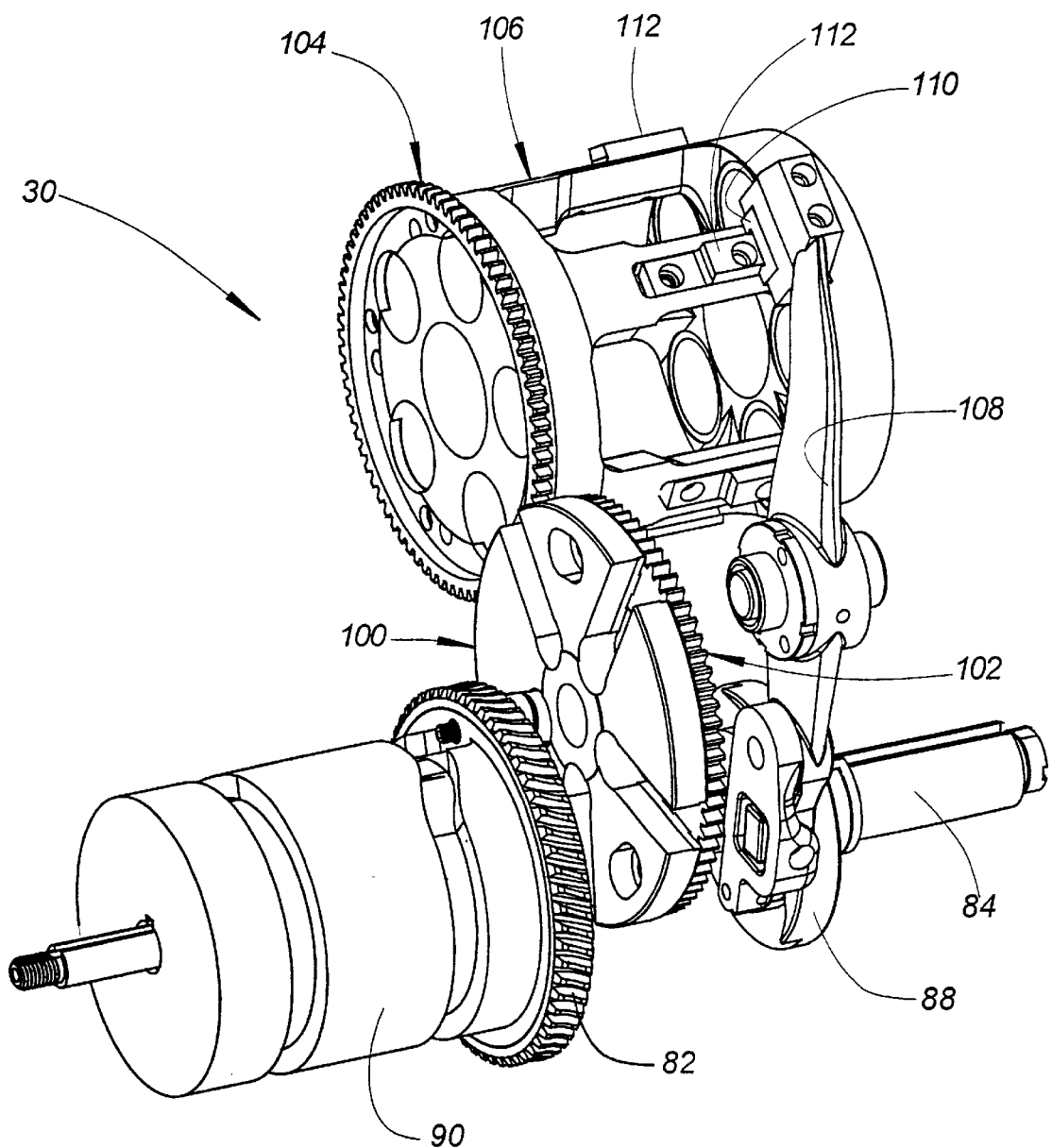
FIG. 7 is a perspective view illustrating component parts of the indexing system of the machine tool of the present invention.

FIG. 7 illustrates the indexing mechanism of the machine tool 30. In addition to rotating the drive shaft 84, the gear 82 which is driven by the worm 80 (not shown in FIG. 6) drives the operating component of a Geneva mechanism 100. Thus, upon each complete revolution of the gear 82, the Geneva mechanism 100 is advanced one segment which, in the case of the machine tool 30, comprises ⅕ of the complete revolution.

A gear 102 is secured to the driven component of the Geneva mechanism 100 for rotation therewith. The gear 102 is mounted in mesh with a gear 104 which is secured to the spindle mechanism 106 of the machine tool 30. The spindle mechanism 106 comprises five spindles. Thus, the Geneva mechanism 100 functions to sequentially advance each spindle of the spindle mechanism 106 from one workstation to the next.

A lever 108 is actuated by the locating cam 88. The lever 108 has a jaw 110 at the distal end thereof. The locating cam 88 functions to selectively engage the jaw 110 with a plurality of teeth 112 projecting from the spindle mechanism 106. In this manner locating cam 88 and the lever 108 function to engage the jaw 110 with the teeth 112 thereby precisely locating the spindle mechanism 106 at each workstation of the machine tool 30.

Figure 8:
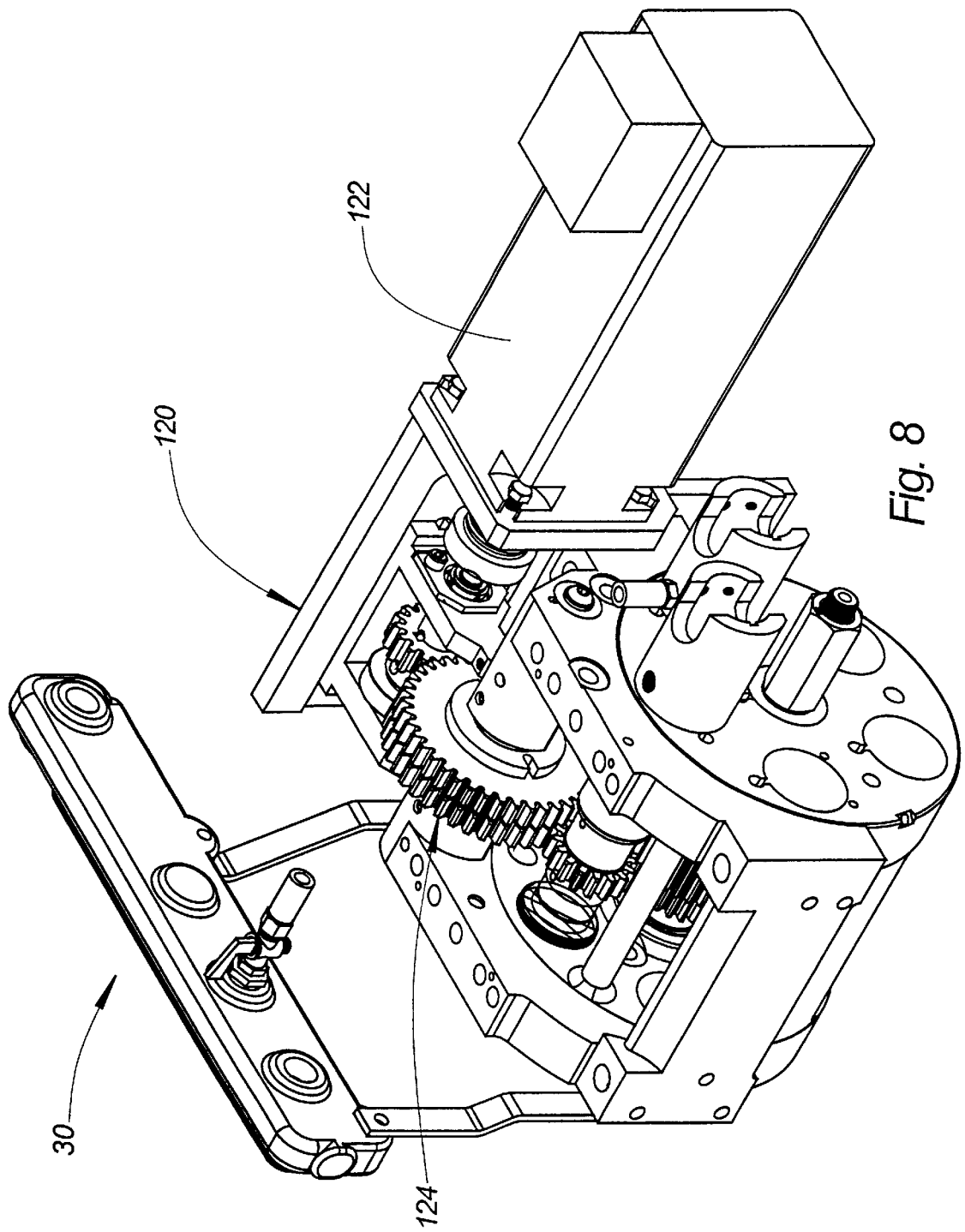
FIG. 8 is a perspective view illustrating the servo threading mechanism of the present invention.

Referring to FIGS. 1, 2, and 8, the machine tool 30 further includes a servo thread cutting assembly 120. The servo thread cutting assembly 120 includes a servomotor 122 which drives a gear box 124. The function of the servomotor 122 and the gear box 124 is to engage one or more thread cutting tools with one or more work pieces at one or more workstations comprising the machine tool 30. In this manner, threads are cut in or on each work piece in accordance with the requirements of a particular machining operation. The gear box 124 is adapted to move the thread cutting tools into and out of engagement with the work piece at different speeds. Typically, disengagement of the thread cutting tools from the work pieces is carried out at a much faster rate as compared with the actual thread cutting operation.

Figure 9:
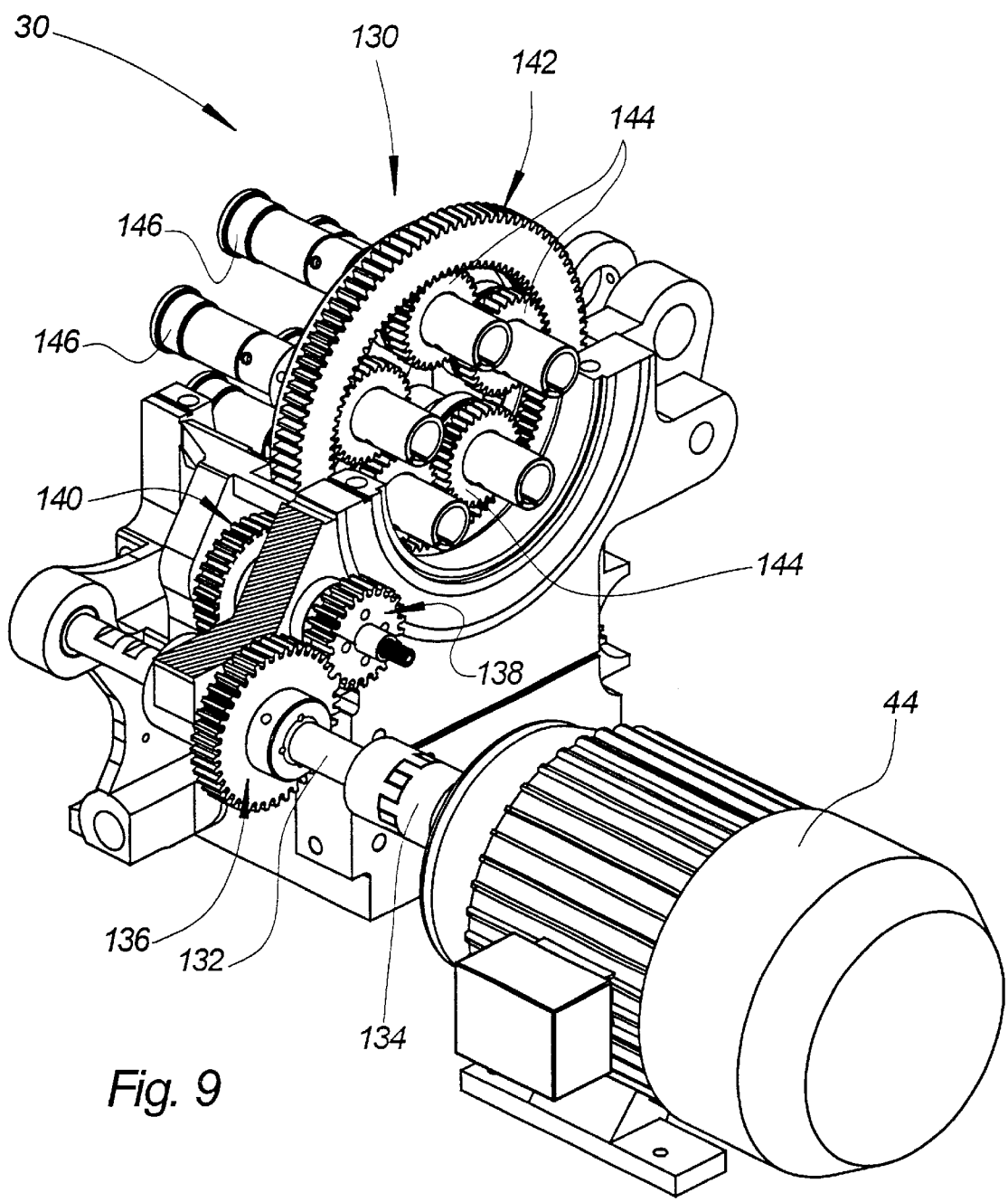
FIG. 9 is a perspective view illustrating the spindle drive mechanism of the machine tool of the present invention.
Figure 10:
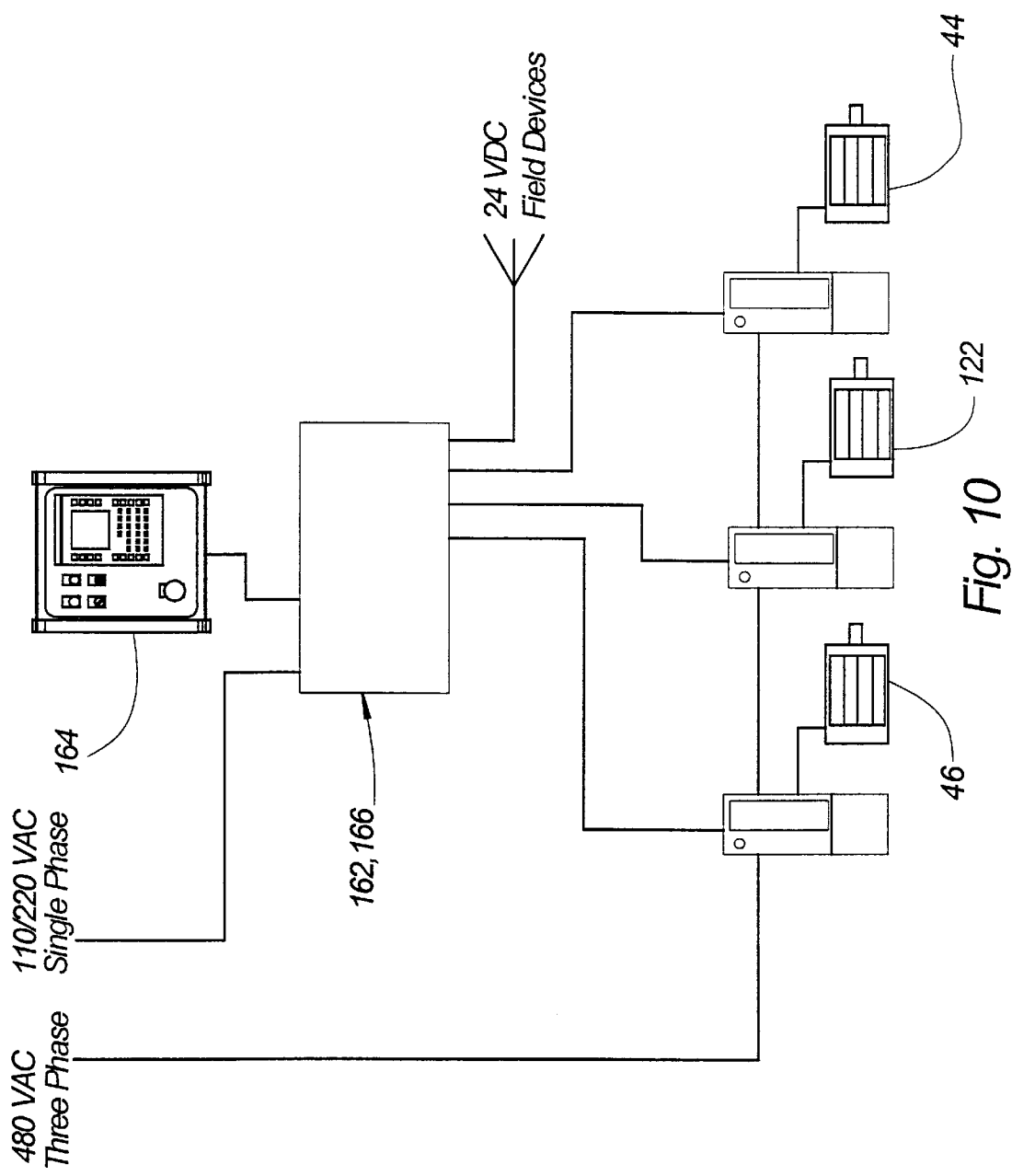
FIG. 10 is a schematic illustration of the control system of the machine tool of the present invention.

Referring to FIG. 9, the machine tool 30 further includes a spindle drive assembly 130. The variable frequency spindle drive motor 44 is operatively connected to a shaft 132 through a coupling 135. The shaft 132 drives a gear 136 which drives a gear 138. The gear 138 in turn drives a gear 140 which drives a ring gear 142.

The ring gear 142 has an external portion which is driven by the gear 140 and an internal portion which drives a plurality of spindle gears 144. The spindle gears 144 each drive a working spindle 146. As will be understood by those skilled in the art, lengths of bar stock which are to be machined by the machine tool 30 extend through and are rotated by the working spindles 146 about longitudinal axes defined by the working spindles 146.

Referring to FIGS. 10–19, inclusive, the machine tool 30 further comprises a control system 160 which controls both the speed of the working spindles motor and the speed rotation of the camshafts. By controlling these functions electronically, a greater range of feeds and speeds is achieved allowing optimization of the machine cycle, thus increasing throughput. The motion control system 160 consists of:

A Programmable Logic Controller (PLC) 162
A Machine Management Interface (MMI) 164
A 2-Axis Motion Module 166
The Servomotor 46
The Variable Frequency Spindle Drive Motor 44
The Servomotor 122

The PLC 162 monitors machine inputs and outputs, provides logic solve, and monitors tool-life counters and machine faults. Spare I/O is allocated for addition of short part detection, broken tool detection, and other options. The PLC 162 stores cycle data in a battery backed RAM which is passed to the MMI 164 and motion module 166 on machine power-up.

The MMI 164 allows selection of the various operational modes of the machine tool 30, annunciates faults, sets/monitors servo positioning and feed-rate, sets/monitors spindle speeds, displays machine diagnostics, and simplifies programmability of the machine cycle.

The motion module 166 controls the profile and feed of the servo motor rotating the side and end camshafts and the speed of the main spindle based on numerical data entered via the MMI 164.

The servomoter 46 drives the side and end camshafts 84 and 74 in a cyclic manner, cycling the machining tools through their profile. The use of the servomoter 46 eliminates the need for high/low speed and starting clutches. Positioning of the servomotor is tracked with the absolute encoder 92.

The variable frequency spindle drive motor 44 controls the speed of the main spindle via input from the MMI, eliminating the need to change gears to achieve various speeds, as well as allowing for a greater range of speeds.

Figure 13:
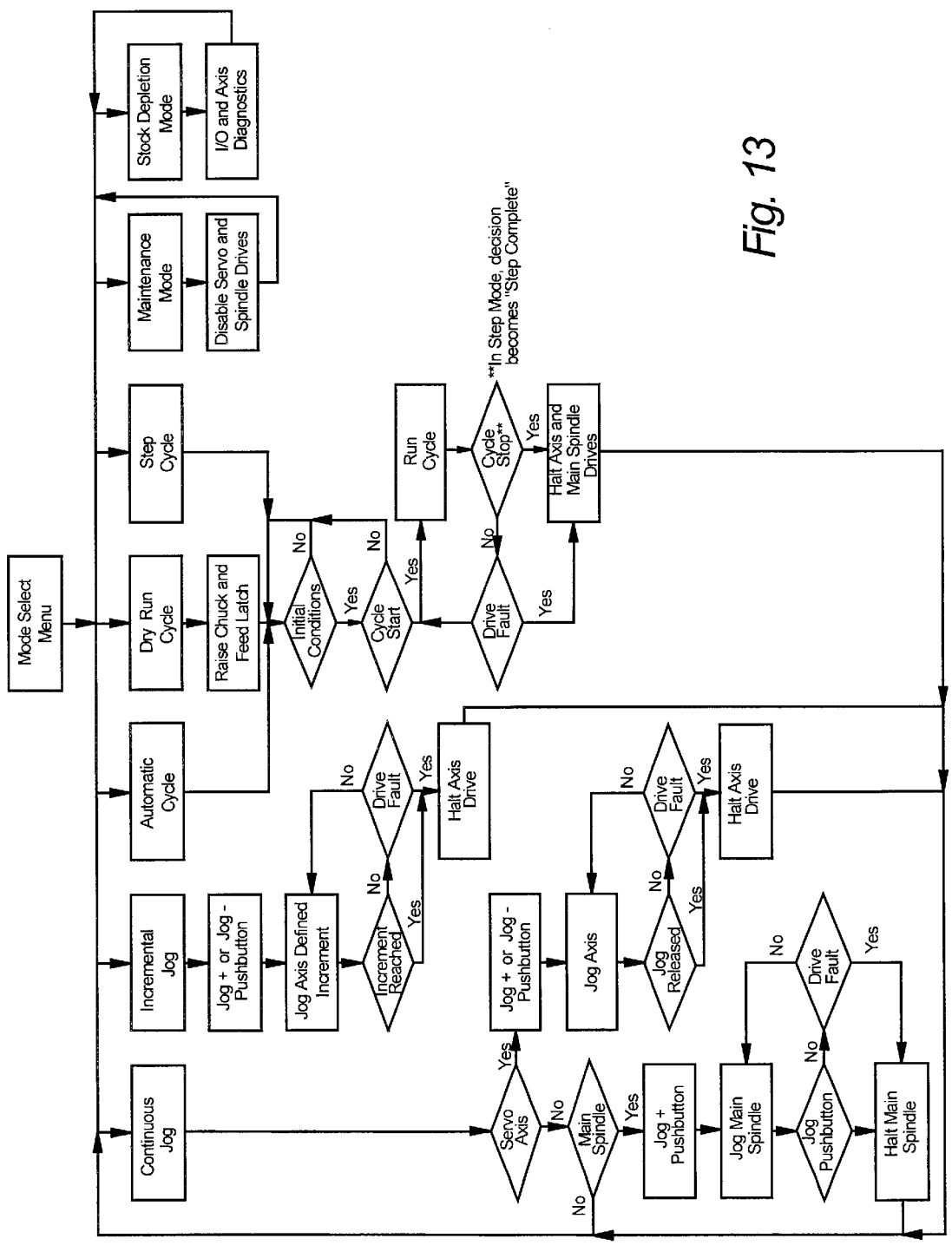
FIG. 13 is a flowchart illustrating the several modes of operation of the machine tool of the present invention.

Referring to FIG. 13, the control system 160 provides seven modes of operation, selectable via the MMI 164 which are:

Continuous Jog
Incremental Jog
Automatic (Production Mode)
Dry-Run
Step
Setup
Diagnostic The Continuous Jog Mode allows manual jogging of the side and end camshafts 84 and 74 at a predetermined speed set by the MMI 164. Rotation of the camshafts allows the machining tools to move in and out over their cam profile. Jogging of the main spindle drive motor 44 is accomplished via a two-position selector switch on the MMI 164.

The Incremental Jog Mode allows jogging of the side and end camshafts 84 and 74 to a preset value (set in cam hundredths) entered in the MMI 164. Each time the Jog push button at the MMI 164 station is activated, the camshafts will increment the programmed distance.

The Automatic Mode (FIG. 14) is the production mode of the machine tool 30. In this mode, the servomotor 46 cyclically performs the predetermined profile set via the MMI 164, in turn cycling the machining tools through their cam profile. Automatic operation is initiated via the Cycle Start push button on the MMI 164. The machine will continually cycle until the operator presses the Cycle Stop push button, which stops the cycle with the tools at the cycle start position (75 cam hundredths).

The Dry-Run Mode (FIG. 15) operates identically to Automatic Mode with the exception that the part and tool life counters are not incremented. The purpose of this mode is to allow warm up of the machine without cutting parts. This is achieved by lifting the collet latch and locking it in the raised position.

The Step Mode (FIG. 16) steps through the motions of a cycle, one at a time, to allow inspection of the part at each step of the process. Each time the Cycle Start push button is pressed, the cycle will step through the next move, retract the tools to a clear position, and then stop the spindles. At this time the setup person may open the cutting chamber door and visually inspect the parts in the spindle, making adjustments as required.

The Setup Mode allows the operator to enter data pertaining to the motion profile desired via the MMI 164. Speeds, feeds, and positional information are specified, and then passed to the PLC 162 and motion module 166 for execution during the operating cycle.

The Diagnostic Mode allows access to items not normally required by the operator. Items such as machine parameters, I/O diagnostics, and drive parameters can be viewed/changed via this mode. Homing of the machine is also performed in this mode, but the use of an absolute encoder makes this necessary only when the servo motor 46 has been removed from the machine.

The positional units of the Servomotor 46 are specified in cam hundredths (3.6°). One complete rotation of the camshaft equates to 100-cam hundredths (360°). The working portion of the cycle (low speed) is between 92 and 59 cam hundredths. The indexing portion of the cycle (high speed) may be defined between 50 and 92.5 cam hundredths. The setup person will specify the working and indexing portions of the cycle by defining these positions in setup mode.

Machine Specifications

Electrical Specifications

| | | |
|---|---|---|
| 1. | Incoming Power | 230 VAC, 60 Amps, 3ø |
| 2. | Control Voltage | 24 VDC |

Control System Specifications

| | | |
|---|---|---|
| 1. | TSX Premium CPU (PLC) | TSX-P57102M |
| 2. | 26W Power Supply,110/220VAC | TSX-PSY2600M |
| 3. | TSX Premium 6 Slot Rack | TSXRKYG |
| 4. | 2-Axis Motion Module | TSXCAY21 |
| 5. | 16pt.24VDC Discrete Input Module | TSXDEY16D2 |
| 6. | 16pt.24VDC Discrete Output Module | TSXDSY16T2 |
| 7. | Modbus Plus PCMCIA Card | TSX-MBP100 |
| 8. | I/O Module Terminal Strip (2) | TSXBLY01 |
| 9. | Magelis Operator Interface (MMI) | XBT-F011110 |
| 10. | Magelis PC Cable | XBT-Z915 |
| 11. | PLC Battery | TSXPLP01 |

Main Spindle Motor Specifications

| | | |
|---|---|---|
| 1. | 10HP Motor, 208/230/460VAC,1720 RPM Magnetek E357 | |
| 2. | Altivar 58 10HP Variable Frequency Drive ATV58HD12M2ZU | |

-continued

| | | |
|---|---|---|
| 3. | Altivar 58 Modbus Plus Communication Card VW3-A58302U | |
| 4. | Dynamic Breaking Resistor VW3-A66714 | |

Side & End Camshaft Motor Specifications

| | | |
|---|---|---|
| 1. | CGP34 Servomotor, 328 in-lbs | S76DE01P010 |
| 2. | M100D 20 A Cyberline Servo Drive | 610MDC22031 |
| 3. | 25' CGP Power Cable | MC-PSSA-025 |
| 4. | 25' CGP Feedback Cable | MC-SSSA-025 |

All electrical controls are located in a 30"w×36"h×12"d machine mounted electrical enclosure. The main operator MMI station 164 is a 20"w×20"h×12"d pendant capable of reaching the front and rear of the machine. Emergency stop push buttons are located permanently at the front and rear stations.

Machine I/O Specifications

Inputs:

Input Card Slot 1:

%I1.0—Front Station Emergency Stop Push Button

%I1.1—Rear Station Emergency Stop Push Button

%I1.2—MMI Station Emergency Stop Push Button

%I1.3—Cycle Start Push Button

%I1.4—Cycle Stop Push Button

%I1.5—Spindle Jog Selector Switch

%I1.6—Spare

%I1.7—Spare

%I1.8—Coolant/Mist Collector On

%I1.9—Coolant/Mist Collector Overload Tripped

%I1.10—Attachment Motor On (Optional)

%I1.11—Attachment Motor Overload Tripped (Optional)

%I1.12—Spare

%I1.13—Spare

%I1.14—Spare

%I1.15—Spare

Input Card Slot 2:

%I2.0—Low Lube Switch

%I2.1—Coolant Pressure OK

%I2.2—Lube Pressure OK

%I2.3—Broken CutOff Switch

%I2.4—Rear Cam Switch (Servo Home)

%I2.5—Stock Depletion Switch (Optional)

%I2.6—Broken Tool Detect Switch (Optional)

%I2.7—Short Part Detected Signal (Optional)

%I2.8—Collet Latch Raised Switch

%I2.9—Collet Latch Lowered Switch

%I2.10—Spare

%I2.11—Spare

%I2.12—Spare

%I2.13—Spare

%I2.14—Spare

%I2.15—Spare

Inputs Via Modbus Plus MMI:

%M—Lube Start/Stop Push Button (from Magelis via MB+)

%M—Coolant Start/Stop Push Button (from Magelis via MB+)

%M—Jog "+" Push Button (from Magelis via MB+)

Figure 12:
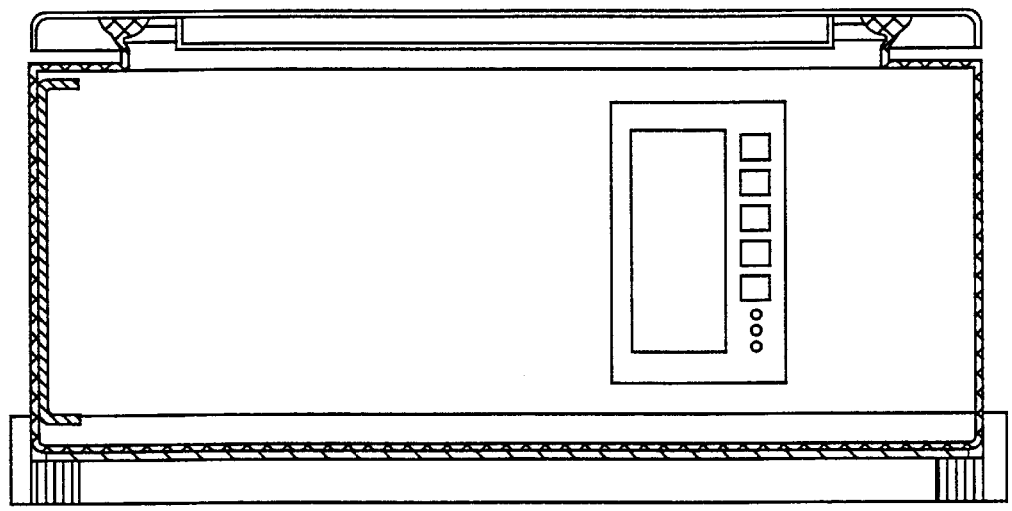
FIG. 12 is a side view of the control panel of FIG. 11.

%M—Jog "−" Push Button (from Magelis via MB+)
%M—Fault Reset Push Button (from Magelis via MB+)
%M—Main Motor On (from Spindle Drive via MB+)
%M—Main Motor Overload Tripped (from Spindle Drive via MB+)
%M—Short Part Bypass Push Button (from Magelis via MB+)
Output Card Slot 3:
%Q3.0—Machine Not In Cycle Stack Light (Red)
%Q3.1—Machine Fault Stack Light (Yellow)
%Q3.2—Machine In Cycle Stack Light (Green)
%Q3.3—Lube Motor Start Relay
%Q3.4—Coolant/Mist Collector Contactor
%Q3.5—Attachment Motor Contactor (Optional)
%Q3.6—Collet Latch Raise Solenoid
%Q3.7—Programmable Air Blast Solenoid (Optional)
%Q3.8—Short Part "Read" Signal (Optional)
%Q3.9—Short Part "Reset" Signal (Optional)
%Q3.10—Spare
%Q3.11—Spare
%Q3.12—Spare
%Q3.13—Spare >%Q3.14—Spare
%Q3.15—Spare Machine Operation Machine Software The motion application includes initialization, manual operation, automatic operation and exception processing. Upon system power up, the motion controller initializes all system parameters according to the values held before power down by polling the PLC register database. Once initialization has been completed, a mode of operation is selected via the MMI. FIG. 12 displays the various mode selections available.

The PLC 162 processes I/O and solves logic for power distribution, air, lubrication, safety interlocks, cycle counters, cycle timers, and mode selection. A portion of the ladder logic is devoted to deriving process signals to interlock and coordinate the ladder logic and motion programs.

Figure 11:
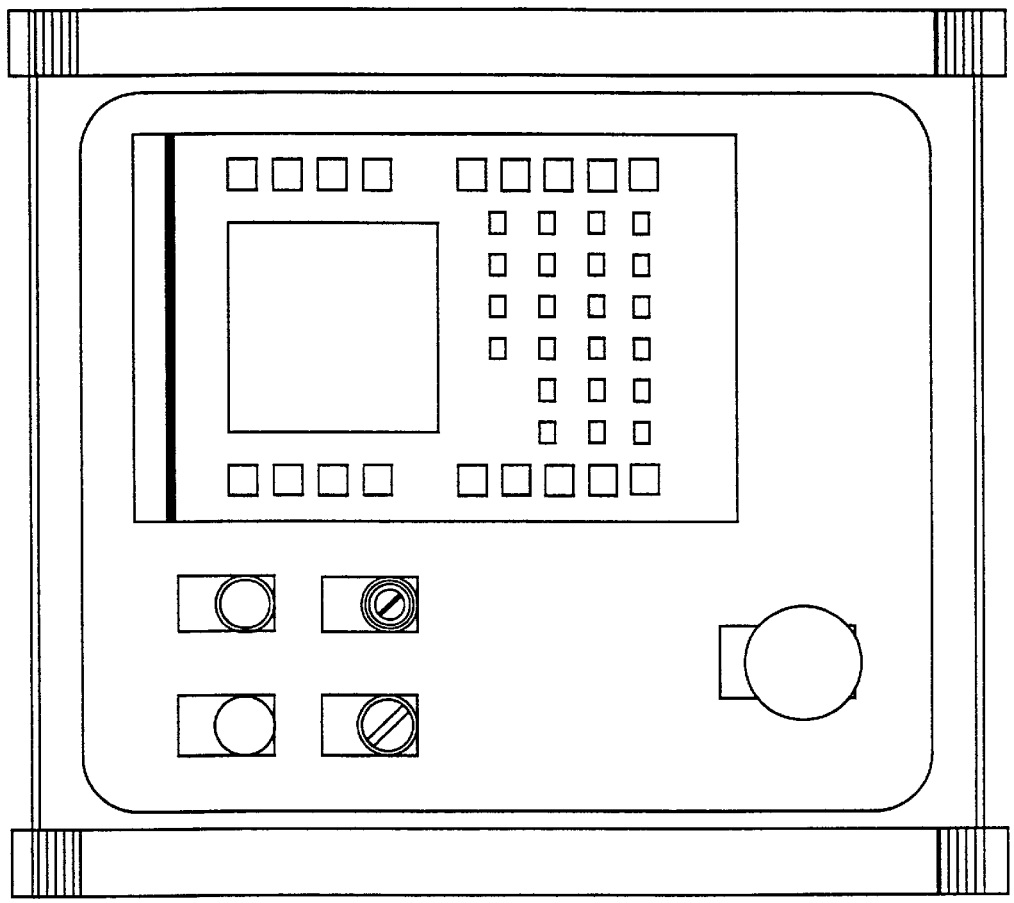
FIG. 11 is a front view of the control panel of the machine tool of the present invention.

Referring to FIGS. 11 and 12, the MMI 164 is the means of controlling the machine. The MMI 164 is located on a pendant arm, which rotates from the front to the rear of the machine. Via the MMI control panel, the operator can:

Select machine modes of operation.
Edit, store, and view various machine parameters.
Access full system fault monitoring.
Access help screens available within the MMI.

Continuous Jog Mode

When "Continuous Jog Mode" is selected, "Continuous Jog" is displayed on the MMI 164 to indicate the control is in "Continuous Jog Mode". While the control is in "Continuous Jog" the jog buttons on the MMI 164 become active, and the "Cycle Start" and "Cycle Stop" push buttons become inactive. In this mode, the operator can jog either the cam axis via push buttons or the main spindle via selector switch on the MMI 164. Speeds of the cam axis and main spindle are set in the machine parameters.

By pressing the "Jog +" or "Jog −" push button, the cam axis will continually jog at a parameter set speed in the respective direction, until the push button is released.

Also while in "Continuous Jog", the "Spindle Run-Stop" selector switch is active. When this switch is in the "Run" position, the work spindles will continually revolve at a parameter set speed, until returning the switch to the "Stop" position.

Incremental Jog Mode

When "Incremental Jog Mode" is selected, "Incremental Jog" is displayed on the MMI 164 to indicate the control is in "Incremental Jog Mode". While the control is in "Incremental Jog" the jog buttons on the MMI 164 become active, and the "Cycle Start" and "Cycle Stop" push buttons become inactive. In this mode, the operator can jog either the cam axis via push buttons or the main spindle via selector switch on the MMI 164. Speeds of the cam axis and main spindle are set in the machine parameters.

In this mode, the operator enters the desired jog increment for the cam axis in the MMI 164 (in cam hundredths), and then presses either the "Jog +" or "Jog −" push button. The cam axis will move the programmed jog increment in the respective direction and stop.

The spindle jog functions in the same manner as it does in "Continuous Jog". With the "Spindle Run-Stop" selector switch in the "Run" position, the work spindles will continually revolve at a parameter set speed, until returning the switch to the "Stop" position.

Figure 14:
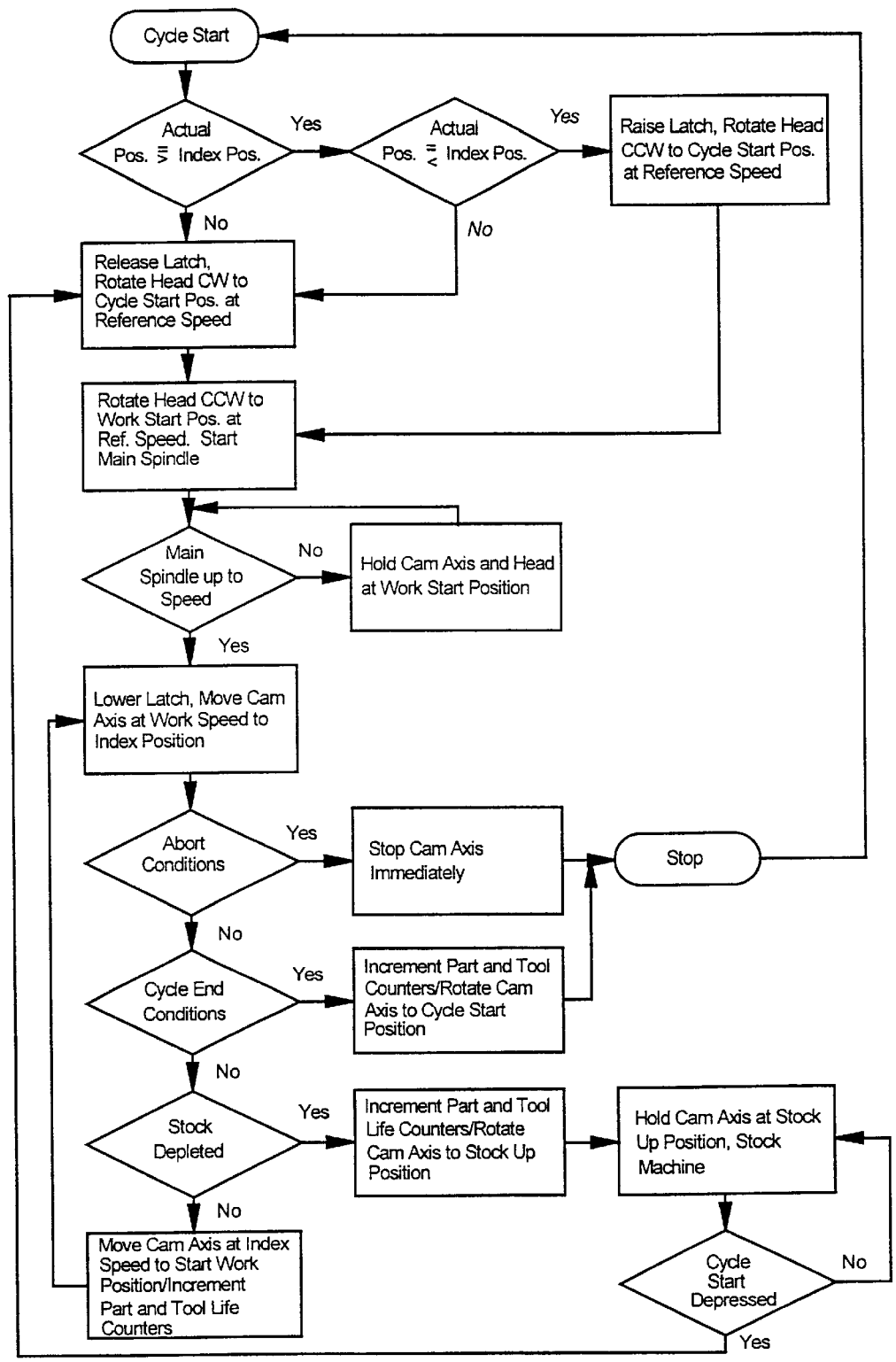
FIG. 14 is a flowchart illustrating the automatic operation sequence of the machine tool of the present invention.

Auto Mode (FIG. 14)

When "Automatic Mode" is selected, "Auto Mode" is displayed on the MMI 164 to indicate the controller is in "Auto Mode". While the control is in "Auto Mode", the jog buttons on the MMI 164 become inactive, and the "Cycle Start" and "Cycle Stop" push buttons become active. Provided valid cycle data has been entered and initial conditions exist, the machine cycle will commence once the "Cycle Start" push button is activated.

The cycle starts by reversing the cam axis at jog speed to the cycle start position (75 cam hundredths). The main spindle is then commanded to cycle speed. Once the spindle reaches speed, the cam axis will move to the work position at jog speed, and then begin the profile specified by the cycle data. The servo speeds used for the two parts of the cycle are calculated based upon the values entered for the "Work Position", "Work Time", "Index Position", and "Index Time".

The machine cycles through the specified profile, incrementing the "Parts Cut" and "Tool Life" counters, until one of the following conditions occur:

An "Emergency Stop" push button is actuated.
The "Cycle Stop" push button is actuated.
The "Parts Cut" counter reaches its preset value.
The "Tool Life" counter reaches its preset value.
A fault condition exists.

When an "Emergency Stop" push button is actuated, all motion ceases immediately. Actuation of the "Cycle Stop" push button, the "Parts Cut" counter reaching its preset value, or the "Tool Life" counter reaching its preset value all cause the machine to stop at the cycle start position (75 cam hundredths). Depending on the severity of the fault condition, the machine may return to the cycle start position (75 cam hundredths), or motion may cease immediately.

Figure 15:
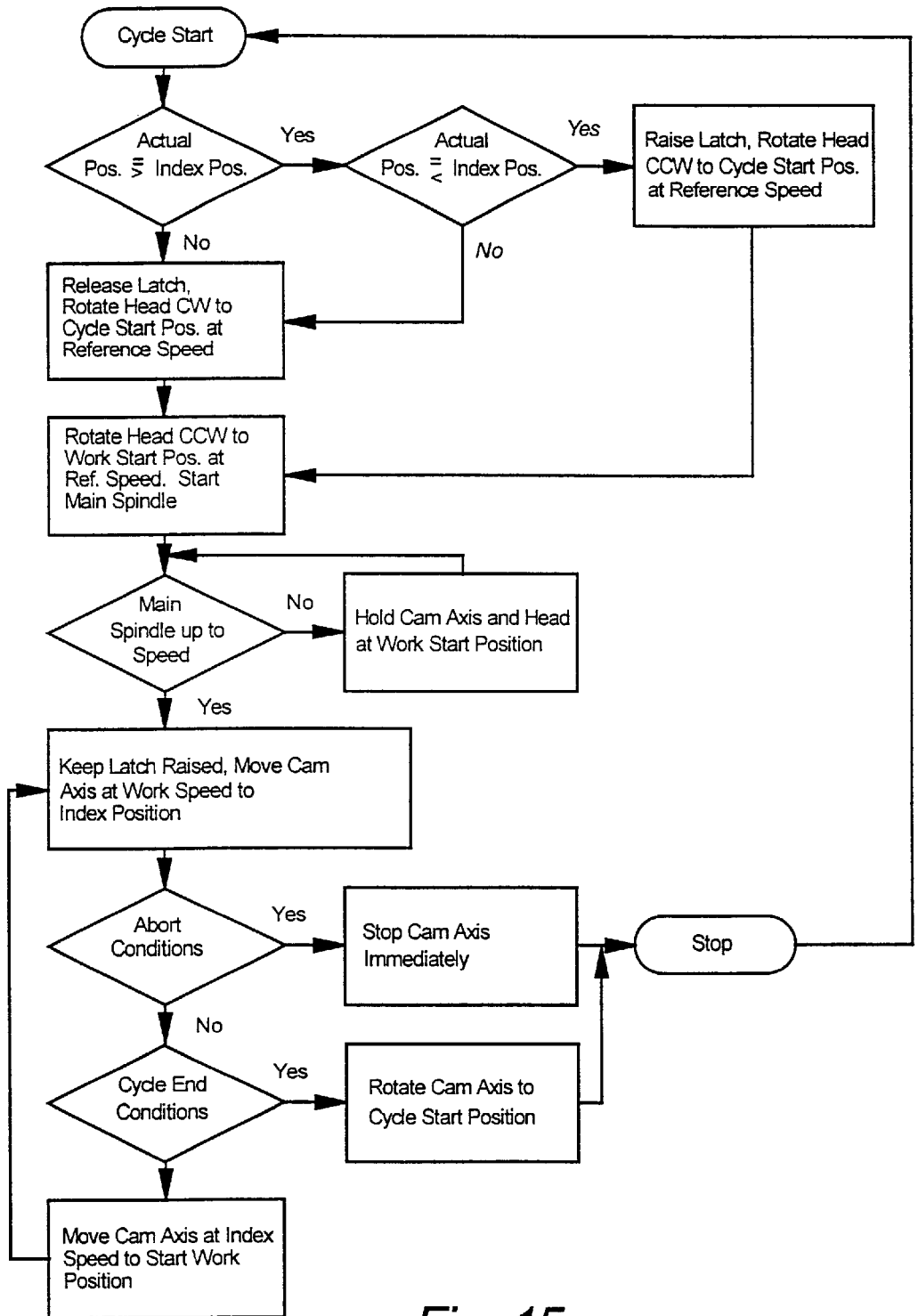
FIG. 15 is a flowchart illustrating the dry-run operation sequence of the machine tool of the present invention.

Dry-Run Mode (FIG. 15)

When "Dry-Run Mode" is selected, "Dry-Run" is displayed on the MMI 164 to indicate the controller is in "Dry-Run Mode". While the control is in "Dry Run", the jog buttons on the MMI 164 become inactive, and the "Cycle Start" and "Cycle Stop" push buttons become active. Provided valid cycle data has been entered and initial conditions exist, the machine cycle will commence once the "Cycle Start" push button is activated. This cycle is intended to warm the machine up before going into production.

Unlike "Auto Mode", in "Dry Run" the collet latch mechanism on the chuck and feed cam is raised via solenoid so that stock will not be fed to the machine. The cycle starts by reversing the cam axis at jog speed to the cycle start position (75 cam hundredths), if necessary. The main spindle is then commanded to cycle speed. Once the spindle reaches speed, the cam axis will move to the work position at jog speed, and then begin the profile specified by the cycle data. The servo speeds used for the two parts of the cycle are calculated based upon the values entered for the "Work Position", "Work Time", "Index Position", and "Index Time".

The machine will continually cycle through the specified profile identical to "Auto Mode", but the controller will not increment the "Parts Cut" or "Tool Life" counters. The cycle will continue until one of the following conditions occur:

An "Emergency Stop" push button is actuated.

The "Cycle Stop" push button is actuated.

A fault condition exists.

When an "Emergency Stop" push button is actuated, all motion ceases immediately. Actuation of the "Cycle Stop" push bottom causes the machine to stop at the cycle start position (75 cam hundredths). Depending on the severity of the fault condition, the machine may return to the cycle start position (75 cam hundredths), or motion may cease immediately.

Figure 16:
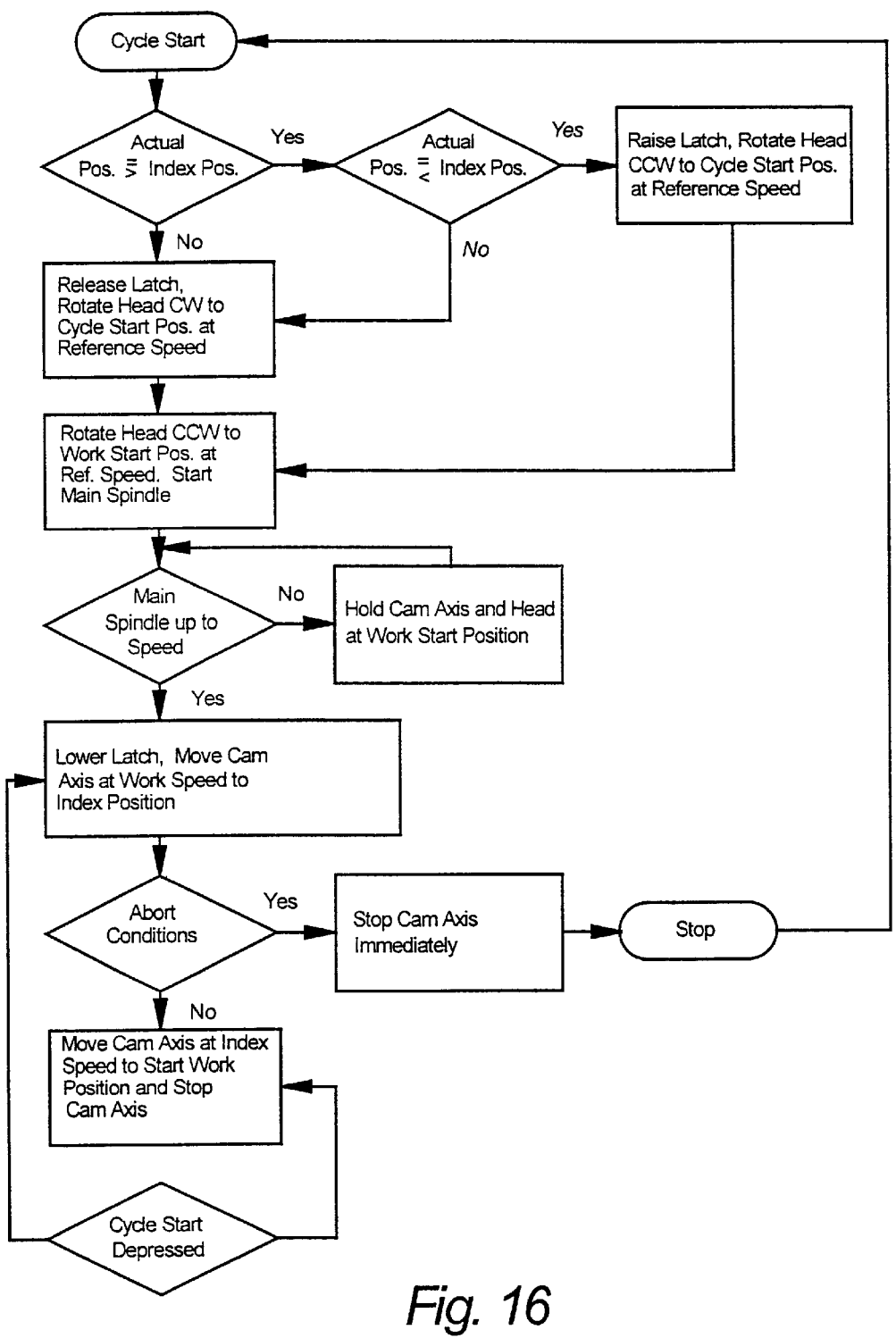
FIG. 16 is a flowchart illustrating the single step operation sequence of the machine tool of the present invention.

Step Mode (FIG. 16)

When "Step Mode" is selected, "Step Mode" is displayed on the MMI 164 to indicate the controller is in "Step Mode". While the control is in "Step", the jog buttons on the MMI 164 become inactive, and the "Cycle Start" and "Cycle Stop" push buttons become active. Provided valid cycle data has been entered and initial conditions exist, the machine cycle will commence once the "Cycle Start" push button is activated. This cycle allows the operator to inspect the part at each step of the process.

Similar to "Auto Mode", the cycle starts by reversing the cam axis at jog speed to the cycle start position (75 cam hundredths). The main spindle is then commanded to cycle speed. Once the spindle reaches speed, the cam axis will move to the work position at jog speed, and then begin the profile specified by the cycle data. The servo speeds used for the two parts of the cycle are calculated based upon the values entered for the "Work Position", "Work Time", "Index Position", and "Index Time".

The machine cycles through one rotation of the cam axis, performing the specified profile, and then stops, allowing the operator to inspect the part. By reactivating the "Cycle Start" push button, the machine will pass through another rotation of the cam axis and stop. This is continued until the operator is satisfied that all tools are properly set. The controller will not increment the "Parts Cut" or "Tool Life" counters in this mode.

Operation of the machine in Step Mode continues until:

An "Emergency Stop" push button is actuated.

The "Cycle Stop" push button is actuated.

A fault condition exists.

When an "Emergency Stop" push button is actuated, all motion ceases immediately. Actuation of the "Cycle Stop" push bottom causes the machine to stop at the cycle start position (75 cam hundredths). Depending on the severity of the fault condition, the machine may return to the cycle start position (75 cam hundredths), or motion may cease immediately.

Figure 17:
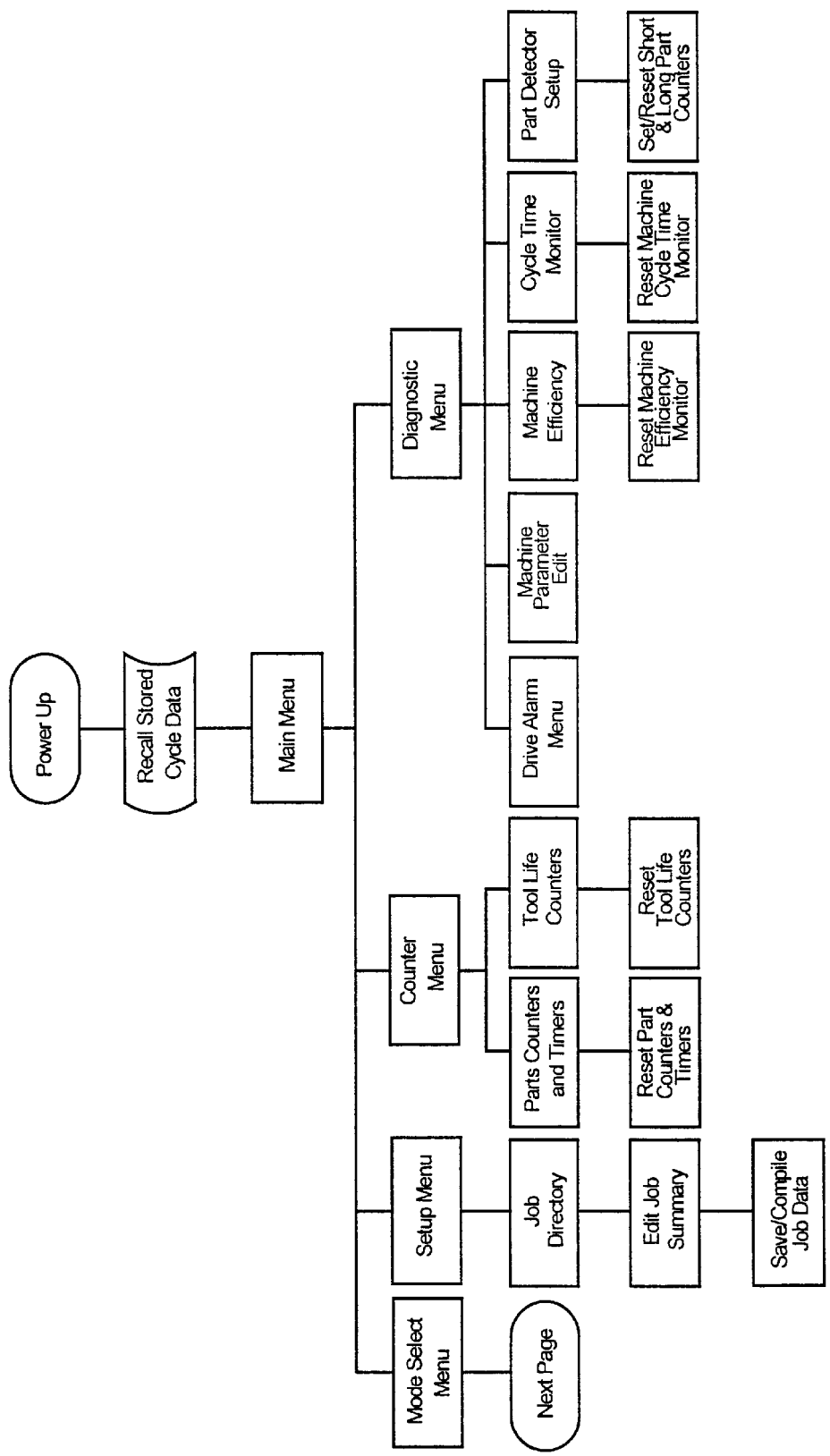
FIG. 17 is a flowchart illustrating the various operational menus which are utilized to set up, control, and diagnose the operation of the machine tool of the present invention.

Setup Mode (FIG. 17)

When "Setup Mode" is selected, "Setup Mode" is displayed on the MMI 164 to indicate the controller is in "Setup Mode". The machine cycle is controlled via parameter input to the MMI 164. When the control is in "Setup Mode", these values may be changed. Valid data must be entered in these parameters before the machine cycle is allowed. Listed below, are the seven parameters related to the machine cycle:

Work Position—the position at which the control commands the cam axis to work speed (cutting speed).
Minimum Value: 0.0 cam hundredths
Maximum Value: 99.9 cam hundredths Work Time—the amount of time for the cam axis to travel between the "Work Position" and "Index Position".
Minimum Value: 0.40 seconds
Maximum Value: 60.00 seconds Index Position—the position at which the control commands the cam axis to index speed.
Minimum Value: 0.0 cam hundredths
Maximum Value: 99.9 cam hundredths Index Time—the amount of time for the cam axis to travel between the "Index Position" and "Work Position".
Minimum Value: 0.40 seconds
Maximum Value: 2.00 seconds Main Spindle Speed—the speed at which the spindles will turn during cycle.
Minimum Value: 200 RPM
Maximum Value: 4000 RPM Stock Position—the position at which the machine will stop when stock depletion is sensed.
Minimum Value: 0.0 cam hundredths
Maximum Value: 99.9 cam hundredths Stock Depletion Check Position—the position at which the machine will check if stock depletion is sensed.
Minimum Value: 0.0 cam hundredths
Maximum Value: 99.9 cam hundredths Air Blast Start Position (Optional)—the position at which the optional programmable air blast will start.
Minimum Value: 0.0 cam hundredths
Maximum Value: 99.9 cam hundredths Air Blast Stop Position (Optional)—the position at which the optional programmable air blast will stop.
Minimum Value: 0.0 cam hundredths
Maximum Value: 99.9 cam hundredths Parts to Cut—the number of parts to cut for this job. Cycle will stop upon reaching this value.
Minimum Value: 1
Maximum Value: 99999999

Tool Life End Spindle #1 Counter—the number of parts before checking tool wear for End Spindle #1. Cycle will stop upon reaching this value.
Minimum Value: 1
Maximum Value: 99999999

Tool Life Cross Slide #1 Counter—the number of parts before checking tool wear for Cross Slide #1. Cycle will stop upon reaching this value.
Minimum Value: 1
Maximum Value: 99999999

Tool Life End Spindle #2 Counter—the number of parts before checking tool wear for End Spindle #2. Cycle will stop upon reaching this value.
Minimum Value: 1
Maximum Value: 99999999

Tool Life Cross Slide #2 Counter—the number of parts before checking tool wear for Cross Slide #2. Cycle will stop upon reaching this value.
Minimum Value: 1
Maximum Value: 99999999

Tool Life End Spindle #3 Counter—the number of parts before checking tool wear for End Spindle #3. Cycle will stop upon reaching this value.
Minimum Value: 1
Maximum Value: 99999999

Tool Life Cross Slide #3 Counter—the number of parts before checking tool wear for Cross Slide #3. Cycle will stop upon reaching this value.
Minimum Value: 1
Maximum Value: 99999999

Tool Life End Spindle #4 Counter—the number of parts before checking tool wear for End Spindle #4. Cycle will stop upon reaching this value.
Minimum Value: 1
Maximum Value: 99999999

Tool Life Cross Slide #4 Counter—the number of parts before checking tool wear for Cross Slide #4. Cycle will stop upon reaching this value.
Minimum Value: 1
Maximum Value: 99999999

Tool Life End Spindle #5 Counter—the number of parts before checking tool wear for End Spindle #5. Cycle will stop upon reaching this value.
Minimum Value: 1
Maximum Value: 99999999

Tool Life Cross Slide #5 Counter—the number of parts before checking tool wear for Cross Slide #5. Cycle will stop upon reaching this value.
Minimum Value: 1
Maximum Value: 99999999

Machine Parameters
Cam Axis Jog Speed—the speed at which the cam axis will jog.
Main Spindle Jog Speed—the speed at which the main spindle motor will jog.
Absolute Encoder Offset—the number of encoder counts required to zero the cam axis.
Cam Axis Home Position—home position of the cam axis.
Cam Axis Start Position—the cam axis will travel in reverse to this position at cycle start.
Cam Axis Torque Limit—torque limit of the cam axis.
Main Spindle Gear Ratio—the gear ratio between the main spindle motor and the center shaft.
Short Part Read Position (Optional)—the position which sends the "read" signal to the short part detector option.
Maintenance Timer Preset—the time interval in hours at which routine maintenance is required. The machine will automatically interrupt cycle upon reaching the timer preset.
Tool Life Warning Period—the number of parts desired as a pre-warning period before cycle is interrupted by the tool life counter.

Machine Diagnostics (FIG. 17)
Operator Prompting and System Fault Monitoring

The lower portion of the MMI 164 has been reserved for operator prompts and fault annunciation. Upon occurrence of any fault or operator prompt, the system will immediately display a message on the MMI 164. The operator can clear the message by pressing the "Message Reset" push button. If the condition still exists, the message will reappear until cleared by the operator.

While the cam axis is moving, whether it is in jog or automatic operation, the controller will constantly monitor the torque commanded to the motor. If the torque exceeds the "Torque Limit" parameter, a fault will occur and immediately halt the cam axis and shut down the main spindle.

Counters and Timers (FIG. 17)

The control system of the machine is equipped with various counters and timers to monitor tool life, parts cut, maintenance time, etc. This menu appears when the "Counter Menu" soft key in the "Diagnostic Menu" is pressed. The counters and timers available are as follows:

Parts Counter A—is a general purpose counter that will simply count the total parts cut since the last time it was reset. The counter resets via soft key. The operator may use this counter for anything desired.

Parts Counter B—is a general purpose counter that will simply count the total parts cut since the last time it was reset. The counter resets via soft key. The operator may use this counter for anything desired.

Parts Remaining Counter—displays the number of parts remaining to cut for the active job. The counter is set at compile to the value entered in the "Parts to Cut" parameter, and will count down from that value. The counter resets via soft key.

Cycle Timer—displays the cycle time of parts cut on the machine.

Maintenance Timer—displays the time interval in hours since routine maintenance was last performed. The machine will automatically interrupt the cycle upon reaching the timer preset which is set in the machine parameters. The timer resets via soft key.

Total Hours of Operation Timer—displays the total hours the machine has been under automatic operation. This timer will not reset.

Tool Life Counter—displays the number of parts remaining to cut before checking tool wear. The counter is set at compile to the value entered in the "Tool Life Counter" parameter, and will count down from that value. A pre-warning period (set by the "Tool Life Warning Period" parameter) is specified to prompt the operator that the cycle is about to be interrupted. The counter resets via soft key.

Figure 18:
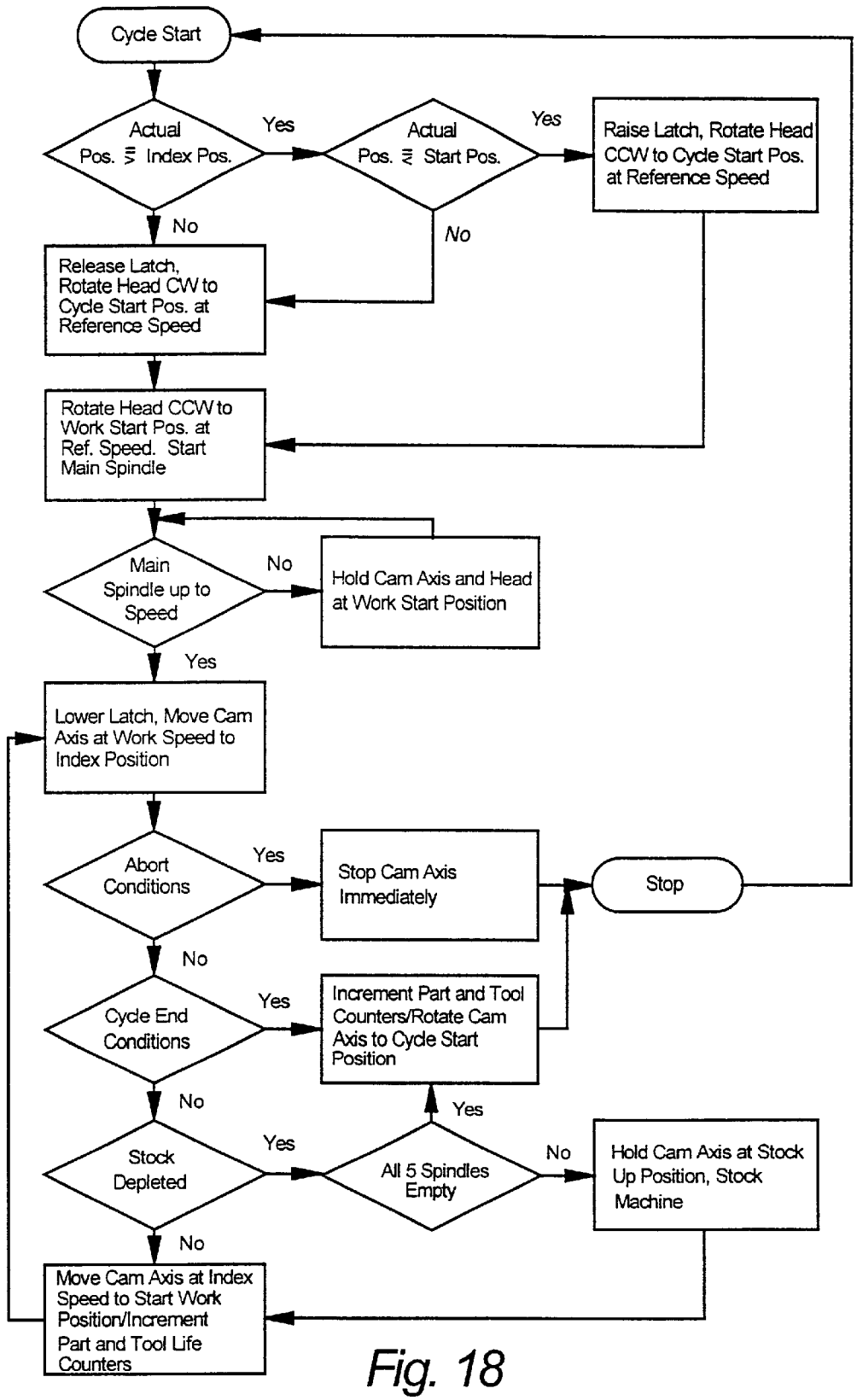
FIG. 18 is flowchart illustrating the stock depletion operation sequence of the machine tool of the present invention.

Referring to FIG. 18, there is shown the stock depletion operation sequence of the control system 160 of the machine tool 30. When the bar stock which is utilized in the operation of the machine tool 30 becomes depleted, the stock depletion operation sequence illustrated in FIG. 18 functions to interrupt operation of the machine tool 30 to allow the depleted stock to be replaced. When replacement of the depleted stock has been accomplished, the stock depletion operation sequence monitors the operation of the machine tool 30 until a stock depletion condition is again recognized, whereupon the sequence is repeated.

Figure 19:
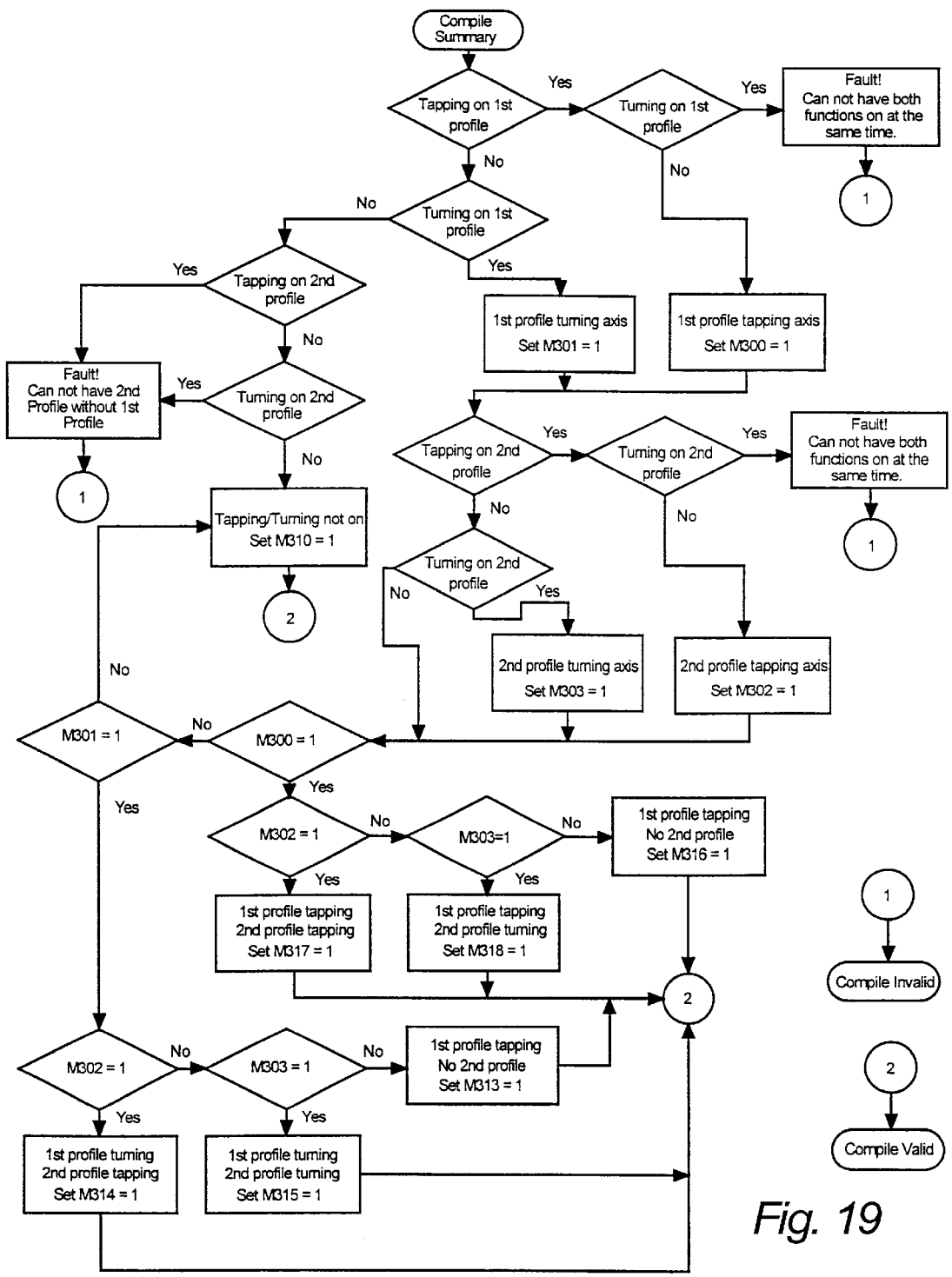
FIG. 19 is a flowchart illustrating the operation and control of the servo threading mechanism of FIG. 8.

FIG. 19 illustrates the control system for the servo thread cutting assembly 120 which is illustrated in FIGS. 1, 2, and 8, and described hereinabove in conjunction therewith. As will be apparent from FIG. 19, the control system 160 of the machine tool 30 does not permit simultaneous turning and tapping of the same part. It is possible, however, to simultaneously turn one part and tap a second part, or to simultaneously turn both parts, or to simultaneously tap both parts. All of the foregoing operations are regulated and controlled in accordance with the provisions illustrated in FIG. 19.

OPERATION

Referring to FIG. 9, operation of the machine tool 30 begins with the installation of bar stock in the five working spindles 146. Each length of bar stock is retained by conventional collet stock. From time to time the lengths of bar stock are moved longitudinally relative to the working spindles 146 by conventional stock pushers. The lengths of bar stock received in the working spindles 146 are rotated about their longitudinal axes by the variable frequency spindle drive motor 44 with the speed of rotation being determined by the programming of the control system 160 of the machine tool 30.

Referring to FIG. 5, the lengths of bar stock received in the working spindles 146 extend parallel to the cam shaft 84 and perpendicular to the cam shaft 74. The servomotor 46 operates the cam shaft 84 to effect rotation of the cams 86. The cams 86 operate levers which in turn carry tooling adapted to effect machining of the bar stock. That is, the cams 86 operate through their respective levers to move the tooling into and out of engagement with the bar stock as the bar stock is rotated by the spindle drive motor 44. In this manner the external surfaces of the lengths of bar stock are machined in accordance with the requirements of a particular machine operation.

Similarly, the cams 76 are rotated by the cam shaft 74 under the action of the servomotor 46. The cams 76 operate levers which carry tooling suitable for the machining of the lengths of bar stock received in the working spindles 146. For the most part the tooling carried by the levers which are actuated by the cam 76 is utilized to perform drilling, tapping and other internal machining operations, it being understood that both the tooling carried by the levers which are actuated by the cams 86 and the tooling carried by the levers which are actuated by the cams 76 are adapted for a wide variety of machining operations all of which are well known in the art.

Referring to FIG. 7, the servomotor 46 also operates the indexing mechanism of the machine tool 30. Thus, during each complete revolution of the cam shaft 84, the indexing mechanism functions to index the spindle mechanism 106 one step. After five successive steps, the spindle mechanism 106 has been returned to its original positioning. In this manner the five lengths of bar stock which are carried by the working spindles 146 are successfully moved through five workstations comprising the machining tool 30.

The servomotor 46 also rotates the chuck and feed cam 90. The function of the chuck and feed cam 90 is to open the chucks or collets which hold the bar stock being machined and to activate the stock pushers, thereby positioning fresh bar stock for machining.

Although preferred embodiments of the invention have been illustrated in the accompanying Drawings and described in the foregoing Detailed Description, it will be understood that the invention is not limited to the embodiments disclosed but is capable of numerous rearrangements, modifications, and substitutions of parts and elements without departing from the spirit of the invention.

What is claimed is:

1. In a machine tool of the type wherein lengths of bar stock are rotated about longitudinal axes and machining tools are actuated by cams to engage the machining tools with the rotating bar stock to effect machining thereof, the improvement comprising:

a plurality of working spindles each for receiving a length of bar stock therein and each defining an axis of rotation of its respective length of bar stock;

a variable speed spindle drive motor;

a gear train operatively connecting the variable speed spindle drive motor to the working spindles to effect rotation of the working spindles and the lengths of bar stock carried thereby about the axes of rotation defined by the working spindles;

a first cam shaft extending parallel to the axes of rotation defined by the working spindles;

a plurality of first cams mounted on the first cam shaft for rotation thereby to cause operation of first machining tools thereby machining the lengths of bar stock carried by the working spindles during rotation thereof under the action of the variable speed spindle drive motor;

an indexing mechanism driven by the first cam shaft for sequentially indexing each of the working spindles through a plurality of workstations;

a second cam shaft extending perpendicularly to the axes of rotation defined by the working spindles;

at least one machining apparatus positioned adjacent the second cam shaft;

at least one first plurality of machining tools positioned adjacent one another along a line extending substantially parallel to the first cam shaft;

at least one second cam mounted on the second cam shaft for rotation thereby to cause operation of the machining apparatus thereby machining the lengths of bar stock carried by the working spindles during rotation thereof under the action of the variable speed spindle drive motor;

a servomotor;

a gear train operatively connecting the servomotor to the first and second cam shafts to effect rotation of the first and second cams and to effect operation of the indexing mechanism independently of the operation of the variable speed spindle drive motor; and a programmable logic controller for controlling the operation of the variable speed spindle drive motor and the servomotor.

2. The improvement according to claim 1 further including an absolute encoder driven by the first cam shaft under the action of the servomotor for producing an output indicative of the operation of the servomotor and for directing the output to the programmable logic controller.

3. The improvement according to claim 1 further including a threading mechanism for performing machining of the lengths of bar stock and a servomotor for operating the threading mechanism under control of the programmable logic controller.

* * * * *